United States Patent [19]
Hoover

[11] 3,794,269
[45] Feb. 26, 1974

[54] FILM CARTRIDGE

[75] Inventor: James E. Hoover, Binghamton, N.Y.

[73] Assignee: GAF Corporation, New York, N.Y.

[22] Filed: June 5, 1972

[21] Appl. No.: 259,618

[52] U.S. Cl. .............................. 242/194, 242/71.2
[51] Int. Cl. ..................... G03b 1/04, G11b 15/32
[58] Field of Search ......... 242/194, 71.2; 24/201 C, 242/259 R, 24/259 B

[56] References Cited
UNITED STATES PATENTS
| | | | |
|---|---|---|---|
| 3,622,101 | 11/1971 | Sutliff et al. | 242/194 |
| 3,338,285 | 8/1967 | Jaster | 24/201 C |
| 3,495,306 | 2/1970 | Eichberg | 24/201 C |

Primary Examiner—Leonard D. Christian
Attorney, Agent, or Firm—Walter C. Kehm; Samson B. Leavitt

[57] ABSTRACT

A super 8 mm film cartridge having a body and spool in which a finger member is integral with the body, and co-acts with the spool. A point of weakening on the finger in the form of a "V" shaped-notch responds to torsional force on such spool and rotation takes place in a direction opposite to normal film movement. Thereafter, bending of the finger at the point of weakening occurs. The bent portion on the finger is positioned away from the movement of the film as it is withdrawn from the cartridge.

5 Claims, 2 Drawing Figures

PATENTED FEB 26 1974  3,794,269

FILM CARTRIDGE

The present invention is directed to an improved movie film cartridge. More particularly, to a Super 8 movie film cartridge having an integral clutch arrangement adapted to cooperate with the film spool to enable such spool to rotate only in one direction, and not in the clockwise direction.

The usual commercially available film cartridge for Super 8mm film is a rectangular cartridge which contains a supply roll and a takeup spool which are rotated and mounted in side-by-side relationship with respect to one another. After the film has been exposed, the exposed film is wound upon the spool and at which point the cartridge containing the film is delivered to the processing laboratory for developing.

Usually such cartridges are provided with various integral or otherwise constructed devices to prevent the film from clock springing when the cartridge is moved. These devices are well known and have been described in the prior art.

In the normal operation of a film cartridge in conjunction with a movie picture camera, the film is let out and advanced onto a spool and eventually ends up in a compartment all wound in the clockwise direction. Obviously, if such spool and film were allowed to rotate oppositely, the film would clock spring and jam in the cartridge.

However, in the processing of the film, there is need to withdraw the film from the cartridge in the counter-clockwise direction. Accordingly, the prior art has examined this problem and attempted to overcome this condition by providing for a means to aid in the removal of the film on the spool.

For example, U.S. Pat. No. 3,550,877 makes use of a tool especially adapted to puncture the cover of the film cartridge and to displace the clutch. However, the device as suggested by this patent necessitates a method of special apparatus for removing the exposed film from the cartridge by means of a tool for disengaging the anti-backup device by a punch which punctures the side of the cartridge and displaces the anti-backup device. Furthermore, in the design of the cartridge utilizing the aforementioned, there need be certain select points on the cover of the cartridges with designated points of weakening so as to enable the punch to enter the cartridge cover without much difficulty. This arrangement has proven to be quite cumbersome and instead film processers have tended to rotate the spool in a counter-clockwise direction without use of the cartridge punch tool and thereby bend the intervening cartridge clutch finger backwards. Obviously, with this approach, since the finger rides on the spool a drag is placed on the film itself, thus increasing the possibility of scratching or breaking such film. In addition the obvious possibility exists of a segment of such clutch breaking and becoming lodged in the cartridge proper and preventing the film from being safely removed.

An adjunct to the above-mentioned patent is U.S. Pat. No. 3,622,101. According to this patent, an anti-backup mechanism is provided which includes a finger or pawl positioned to cooperate with a rachet body on the film spool. Engagement of the pawl and spool rachet prevents rotation in one direction, while enabling rotation in the opposite direction for film winding. The rachet teeth for engaging the pawl are especially shaped to permit one-way rotation. The film is removed through the cartridge aperture by puncturing the cartridge with a special tool and displacing or breaking the pawl.

Obviously, an alternate, simple and safe approach to withdrawal of film without any of the shortcomings of the above arrangement is desirable. The essential feature of the improved spool-clutch arrangement includes a means by which the film can be withdrawn without breaking or scratching and without having any portion or portions of the broken clutch member jam as such film is withdrawn.

The principal features of the present invention is directed to an improved film cartridge body and spool assembly suitable for use with Super 8mm movie film including; a finger member integral with the cartridge; several ridges disposed about the periphery of said spool, said finger cooperating with said ridges enabling advance of the film in a first direction only; and an area of weakening on said finger, such that the application of a torque on the spool in the second direction transmits a proportional force to the finger, causing bending of said finger at said point of weakening to effectively permit said psool to freely rotate in the second direction.

Also within the scope of the present invention is an improved film cartridge where the area of weakening includes a "V"-shaped notch.

The principal object of the present invention is to provide for an improved movie film cartridge.

Another object of the invention is to provide a spool with ridge members adapted to cooperate with a finger member extending from a portion of the cartridge integral therewith having a point of weakening on such finger responsive to a tortional force in the counter-clockwise direction as applied to the spool.

A further object of the present invention is to provide a finger member adapted to cooperate with a ridge on a spool which finger member is provided with a working end surface that is angled at 15° to a plane through the longitudinal axis of the finger, so as to enable the transmission of a force upon such finger to the point of weakening when a counter-clockwise force is applied to the spool.

Other objects and advantages of the present invention characteristic to the invention are set forth in the appended claims.

Although the invention illustrated and described herein as embodied in an improved film cartridge with a finger rachet arrangement having a point of weakening on such finger, it is nevertheless not intended to be limited to the details shown, since various modifications and structural changes may be made therein without departing from the spirit of the invention and within the scope and range of the equivalents of the claims.

The construction and operation of the invention, however, together with additional objects and advantages thereof will be best understood from the following description of the specific embodiment when read in connection with the accompanying drawings in which.

Figure 1:
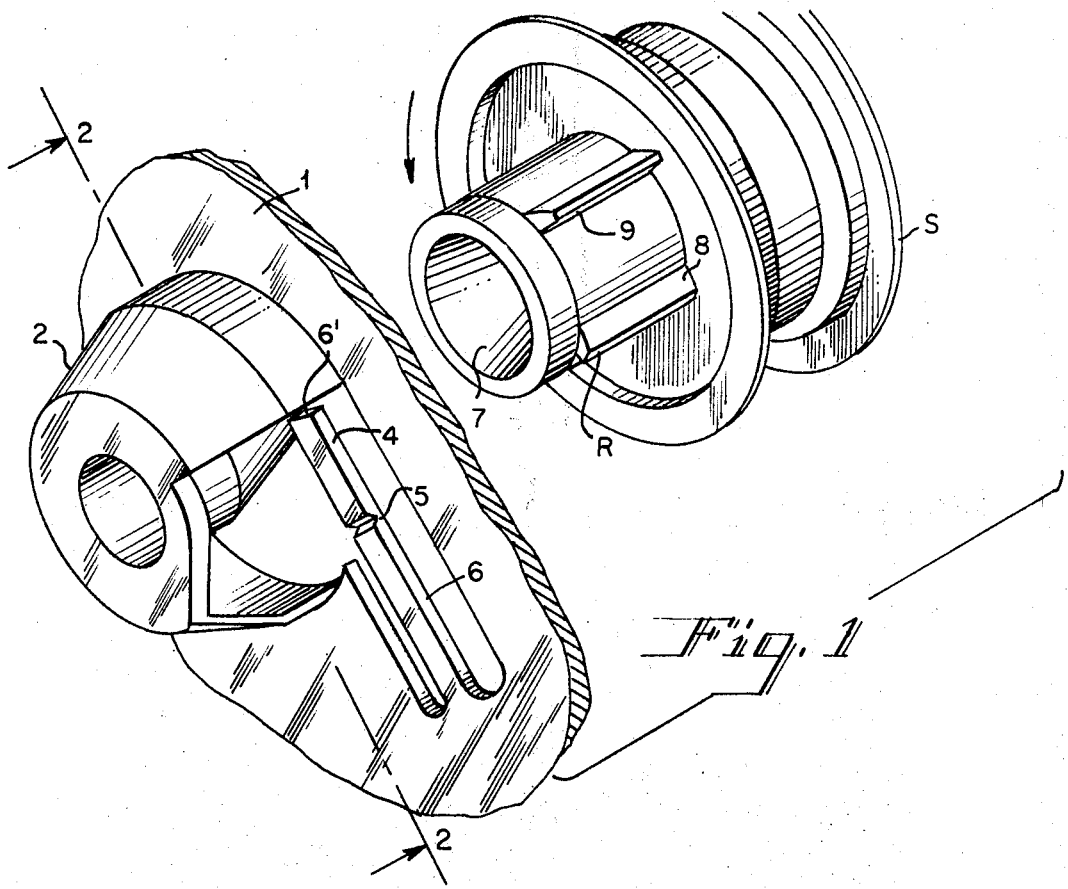
FIG. 1 illustrates a fragmentary view of the spool and cartridge body arrangement in axial alignment with one another.

According to FIG. 1, there is provided a cartridge body with a centrally disposed axial member suitable for receipt of a spool containing the exposed movie film. The details of the cartridge are broken away and the essential element of this invention consists of a hub or member having a central member extending therefrom (not shown) for receiving spool S through opening 7. When spool S is so disposed, it is able to rotate in the cartridge in the clockwise direction which is the direction in which the film as exposed is wound up. The spool S is prevented from moving in the counter-clockwise direction by the co-action of ridges R as engaged by the finger 4 in a manner that enables the finger to glide off the sloping surface 8 on ridges R to prevent counter movement via flat surface 9.

Figure 2:
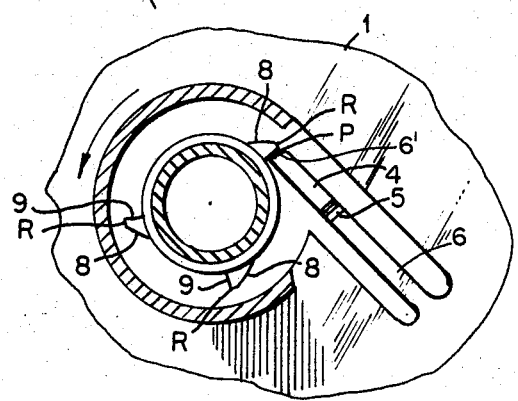
FIG. 2 is a the sectional view through the cartridge and the spool of FIG. 1, taken along line 2—2 and illustrates the line of contact as well as the point of weakening on the pawl.

In the event it is desired to rotate the spool S in a counter-clockwise direction to enable the film to be withdrawn from the cartridge, it becomes apparent that the finger 4 will engage the ridge R in such manner so as to form a resistance to the counter-clockwise movement of the spool S. When this occurs, the forces as between the ridge R and the finger 4 are transmitted from the point of initial contact P along longer finger 4 to a point of weakening 5. As the torsional force is increased on the spool S in the counter-clockwise direction, the forces upon the point of weakening 5 on the finger 4 eventually overcomes the resistance by the finger 4 against such spool movement to enable free rotational movement of the spool S in the counter-clockwise direction. The portion 6 of the finger 4 that is bent, remains integral with such finger and does not normally fall away to the interior of the cartridge to hamper the free movement of the film as it is being withdrawn from the cartridge. In the event the short portion of finger 4 is completely snapped off, it usually falls freely into a cartridge cavity and is trapped in a manner that would not be injurious to the film. As will be seen from FIG. 2, the portion of the finger 6 in contact with the ridges R is a sloping portion 6' which may slope for about 15° to a plane through the longitudinal axis of the finger. The working angle of finger 4 is quite important, since it governs the manner in which the finger 4 contacts ridge R enabling transmission of torsional forces to the point of weakening 5 in a most efficient manner without creating any side effects injurious to the removal of the film. The point of weakening 5 can take different forms; however, in the present invention, it has been found that a "V" notch has proven to be quite successful.

As will be seen from the accompanying Figures, the concept of the present invention is one that requires no additional implements or tools for removal of the film in the counter-clockwise direction. The finger 4 is one that is integral with the cartridge body and does not injure the film during removal. The arrangement of the finger 4 with respect to the spool S is entirely functional and simple in its operation. The finger 4 will give way at its point of weakening 5 with just the normal amount of torsional force required to overcome the resistance to counter-clockwise movement.

In the claims:

1. An improved film cartridge body and spool assembly suitable for use with Super 8mm movie film including: a finger member integral with the cartridge; a plurality of ridges disposed about the periphery of said spool, said finger cooperating with said ridges enabling advance of the film in a first direction only; and an area of weakening on said finger, such that the application of a torque on the spool in the second direction opposite to said first direction transmits a proportional force to the finger, causing bending of said finger at said point of weakening to allow passage of said ridges and thus permit said spool to freely rotate in the second direction.

2. An improved film cartridge body and spool as claimed in claim 1, wherein said area of weakening includes a "V"-shaped notch.

3. An improved film cartridge body and spool as claimed in claim 1, wherein said finger is provided with a working surface that is 15° to a plane through the longitudinal axis of the finger.

4. An improved film cartridge body and spool as claimed in claim 1, wherein the section of said finger in the bent condition is disposed out of the path of film being withdrawn from said cartridge.

5. An improved film cartridge body and spool assembly suitable for use with Super 8mm movie film including: a finger member integral with said cartridge having a working surface that is 15° to the vertical; a plurality of ridges disposed about the periphery of said spool, said finger cooperating with said plurality of ridges enabling advance of the film in a first direction only; and an area of weakening on said finger in the form of a "V"-shaped notch, such that the application of a torque on the spool in the second direction opposite to first said direction transmits a porportional force to the finger causing bending of said finger at said point of weakening to allow passage of said ridges and thus permit said spool to freely rotate in the second direction.

* * * * *